United States Patent
Dworakowski et al.

(10) Patent No.: US 11,772,683 B2
(45) Date of Patent: Oct. 3, 2023

(54) AUTOMATED DRIVING SYSTEM

(71) Applicant: Aptiv Technologies Limited, St. Michael (BB)

(72) Inventors: Waldemar Dworakowski, Cracow (PL); Marzena Banach, Puszczykowo (PL); Rafal Dlugosz, Luboń (PL)

(73) Assignee: Aptiv Technologies Limited, St. Michael (BB)

( * ) Notice: Subject to any disclaimer, the term of this patent is extended or adjusted under 35 U.S.C. 154(b) by 102 days.

(21) Appl. No.: 17/475,127

(22) Filed: Sep. 14, 2021

(65) Prior Publication Data
US 2022/0089193 A1 Mar. 24, 2022

(30) Foreign Application Priority Data

Sep. 18, 2020 (EP) ..................................... 20197041

(51) Int. Cl.
*B60W 60/00* (2020.01)
*B60W 30/14* (2006.01)
*B60W 40/08* (2012.01)
*B60W 40/105* (2012.01)

(52) U.S. Cl.
CPC .... *B60W 60/00186* (2020.02); *B60W 30/146* (2013.01); *B60W 40/08* (2013.01); *B60W 40/105* (2013.01); *B60W 60/0016* (2020.02); *B60W 2040/0818* (2013.01); *B60W 2540/229* (2020.02)

(58) Field of Classification Search
CPC ...... B60W 60/00; B60W 30/00; B60W 40/00; B60W 2040/00; B60W 2540/00
See application file for complete search history.

(56) References Cited

U.S. PATENT DOCUMENTS

| | | | | |
|---|---|---|---|---|
| 7,519,843 | B1* | 4/2009 | Buterbaugh | G06F 1/3203 713/340 |
| 10,459,444 | B1* | 10/2019 | Kentley-Klay | G05D 1/0027 |
| 11,340,617 | B1* | 5/2022 | Awad | G05D 1/0214 |
| 2016/0039414 | A1 | 2/2016 | Kawai | |
| 2018/0335775 | A1 | 11/2018 | Konishi et al. | |

(Continued)

FOREIGN PATENT DOCUMENTS

DE 102018210367 1/2020

OTHER PUBLICATIONS

Platini, M., Ropars, T., Pelletier, B., & De Palma, N. (Nov. 2018). CPU overheating characterization in HPC systems: a case study. In 2018 IEEE/ACM 8th Workshop on Fault Tolerance for HPC at extreme Scale (FTXS) (pp. 59-68). IEEE. (Year: 2018).*

(Continued)

*Primary Examiner* — Aniss Chad
*Assistant Examiner* — Elizabeth J Slowik
(74) *Attorney, Agent, or Firm* — Sawtooth Patent Group PLLC

(57) ABSTRACT

An automated driving system (ADS) includes an automation control module for controlling one or more driving functions of a vehicle, and a safety control module for determining one or more operating conditions relevant to the safety performance of the vehicle, such as driver awareness and processor temperature. The automation control module is configured to automatically adjust the speed of the vehicle based on the one or more operating conditions determined by the safety control module.

20 Claims, 3 Drawing Sheets

(56) References Cited

U.S. PATENT DOCUMENTS

| | | | |
|---|---|---|---|
| 2019/0080602 A1* | 3/2019 | Rice | B60H 1/00878 |
| 2019/0120313 A1* | 4/2019 | Heeder | F16D 65/0062 |
| 2019/0171263 A1* | 6/2019 | Winkel | G06F 1/3206 |
| 2019/0382018 A1* | 12/2019 | Garnault | B60W 30/18163 |
| 2020/0055518 A1* | 2/2020 | Johnson | B60W 10/10 |
| 2020/0117565 A1 | 4/2020 | Ponnuvel et al. | |
| 2020/0207363 A1 | 7/2020 | Deshpande | |
| 2020/0285233 A1 | 9/2020 | Hafner et al. | |
| 2020/0301414 A1* | 9/2020 | Schwie | G01K 13/00 |
| 2021/0247762 A1* | 8/2021 | Park | G05D 1/0055 |
| 2021/0316765 A1* | 10/2021 | Hardå | B60W 60/0015 |
| 2021/0407313 A1* | 12/2021 | Urano | G09B 9/052 |

OTHER PUBLICATIONS

"Extended European Search Report", EP Application No. 20197041.5, dated Jun. 8, 2021, 9 pages.

* cited by examiner

AUTOMATED DRIVING SYSTEM

CROSS-REFERENCE TO RELATED APPLICATION

This application claims priority to European Patent Application Number 20197041.5, filed Sep. 18, 2020, the disclosure of which is hereby incorporated by reference in its entirety herein.

BACKGROUND

Automated Driving Systems (ADS) have become more prevalent in recent years. Such systems are broadly classified into 5 levels defined by the SAE J3016 standards, with levels one and two relating to more basic driver assistance and partial automation functions, and higher levels three to five relating to more advanced functionality where, at least under certain circumstances, the human driver no longer has to actively monitor the driving environment.

Level one and two systems are often referred to as Advanced Driver Assistance Systems (ADAS). In these cases, the driver is required to maintain awareness and be prepared to intervene immediately in the event that the ADAS is unable to respond appropriately to a driving situation. As such, in an ADAS operating at level one or two, the system will monitor driver awareness and provide a warning to the driver as soon as a lack of awareness is detected. For example, an automatic lane keeping system will issue an alert to the driver if their hands stray from the wheel for more than a predetermined time, for instance, by outputting an audible alarm and vibrating their seat.

Although providing an alert to the driver has been sufficient to meet formal and legal requirements for such systems, this warning functionality does not guarantee safety in practice. For example, a driver who has momentarily fallen asleep will not regain complete situational awareness immediately when they are woken by an alert. As such, there may be a delay in their ability to respond rapidly if the ADAS is unable to handle the current driving situation. Indeed, a driver who is suddenly startled awake may even take erratic actions in the moments before their situational awareness is fully restored. As such, there is a need for an improved way of dealing with a scenario where the driver loses awareness.

The above issue remains important as more advanced level 3 systems become available. In this case, automation is conditional and hence a driver may still be asked to retake control within a limited time if driving conditions change. Therefore, there also remains a need to improve the handling of scenarios where the driver is required to intervene and retake manual control of the vehicle.

A further issue with conventional ADS' arises due to high processing demands that could be imposed during some complex driving situations. Complex driving situations typically arise when one or more complicating factors coincide. For instance, navigating a relatively complex road junction may become a complex driving situation if traffic is particularly heavy or if visibility is low because of fog or rain. In these extreme scenarios, the processing load will increase the thermal output of the ADS, which is often implemented within the vehicle's electronic control unit (ECU), and this could in turn lead to overheating within the processing environment. As such, it is necessary for the air or liquid cooling systems associated with the ECU to be able to maintain operations in such extreme situations, even though these situations occur very rarely throughout the lifetime of the equipment. Consequently, the cost and complexity of the cooling systems required for an ECU having ADS functionality is very high. There is therefore a desire to reduce these costs.

SUMMARY

The present disclosure relates to an Automated Driving System (ADS) and to a vehicle's electronic control unit incorporating the same. The disclosure also relates to software for implementing ADS. The present disclosure is particularly relevant to vehicles, including cars, with advanced driver assistance systems and autonomous driving capabilities.

According to a first aspect, there is provided an automated driving system, including: an automation control module for controlling one or more driving functions of a vehicle; a safety control module for determining one or more operating conditions relevant to the safety performance of the vehicle, wherein the automation control module is configured to automatically adjust the speed of the vehicle based on the one or more operating conditions determined by the safety control module.

In this way, the speed of the vehicle may be automatically adjusted to selectable levels, either dynamically or pre-defined, based on the determined vehicle operating conditions that impact safe driving performance at current vehicle speeds. As such, safety performance may be maintained or optimised, with speed adjustments being implemented in a safe manner according to the ADS's perception systems and accounting for current conditions, such as other traffic, and in combination with other complementary changes of road lane and vehicle signalling.

In embodiments, the automation control module reduces the speed of the vehicle in response to the one or more operating conditions indicating a reduced safety performance scenario at a current vehicle speed. As such, when conditions arise that would compromise the safety of the vehicle to below an acceptable performance threshold, the speed of the vehicle may be automatically reduced to maintain safety performance.

In embodiments, the one or more operating conditions relevant to the safety performance of the vehicle include one or more of driver awareness and processor temperature. As such, if the driver loses awareness or the processor implementing the ADS is at risk of overheating, the speed of the vehicle may be reduced to maintain safety performance. Conversely, if a driver regains awareness or the processor has thermal capacity to process driving operations faster, the speed of the vehicle may be increased to optimise driving performance. It will be understood that the processor temperature may be determined based on one or more of temperature sensor inputs, processor load measurements, and load estimations based on upcoming road situations.

In embodiments, the automation control module adjusts the speed of the vehicle by one of a pre-determined level and a dynamic level based on the one or more operating conditions.

According to a second aspect, there is provided an automated driving system, including: a driver awareness module for determining a level of driver awareness based on one or more driver awareness inputs; an automation control module for controlling one or more driving functions of a vehicle and being operable at a lower automation level and a higher automation level; wherein the automation control module activates the higher automation level in response to the driver awareness module determining that the level of driver awareness is below an awareness threshold. Accordingly, in this way, in situations where a driver loses awareness, for instance if they fall asleep or become distracted, the ADS switches to a higher level of automation to maintain safety.

In embodiments, the higher automation level is associated with the limitation of one or more control parameters. As such, the increase in automation may coincide with a compromise in performance, thereby encouraging the driver to maintain awareness.

In embodiments, the limitation of one or more control parameters comprises limiting the vehicle's speed. As such, a loss of driver awareness may prompt an automatic reduction in vehicle speed, which may both improve safety and provide an unobtrusive alert to the driver that they have lost awareness. Therefore, rather than startling the diver awake, they are given time to regain awareness, whilst only sacrificing a minor reduction in vehicle speed in the meantime. For example, the vehicle speed may be reduced by 20%-40% of current speed in the event of a loss of awareness. The reduction in vehicle speed may be performed in collaboration with perception systems of the ADS for ensuring the speed reduction is carried out in a safe manner depending on conditions, such as the level of traffic. The reduction in vehicle speed may also be performed in conjunction with other complementary actions, such as a change in road lane.

In embodiments, the lower automation level corresponds to level 1 or 2. As such, the lower automation level may correspond to an ADAS.

In embodiments, the higher automation level corresponds to level 4 automation or higher.

According to a third aspect, there is provided an automated driving system, including: an automation control module for controlling one or more driving functions of a vehicle; a temperature control module for identifying a processor overheating scenario, wherein the processor overheating scenario leads to the automation control module exceeding an operating temperature threshold, wherein the automation control module is configured to reduce the speed of the vehicle in response to the temperature control module identifying a processor overheating scenario.

In this way, the risk of processor overheating may be mitigated by reducing the processing load imposed on the ADS. As a consequence, reliability is improved, and less complex and expensive processor cooling systems are required, thereby reducing costs. It will be understood that the reduction in vehicle speed may be performed in collaboration with perception systems of the ADS for ensuring the speed reduction is carried out in a safe manner depending on conditions, such as the level of traffic. The reduction in vehicle speed may also be performed in conjunction with other complementary actions, such as a change in road lane.

In embodiments, the temperature control module identifies the processor overheating scenario based on a detected processor rate or a detected temperature exceeding a threshold. In this way, processing load or temperature sensors may alert the ADS to a potential overheating scenario, thereby allowing the ADS to reduce the vehicle's speed to avoid overheating.

In embodiments, the temperature control module identifies the processor overheating scenario based on the detected processor rate or the detected temperature exceeding the threshold for a predetermined duration. In this way, momentary increases in processing load or temperature do not automatically lead to a reduction in driving speed.

In embodiments, the temperature control module identifies a processor overheating scenario based on identifying a complex driving situation. In this way, road situations which are likely to impose a heavy demand on processing power may be pre-emptively identified, allowing the ADS to reduce the speed, thereby mitigating those anticipated processing requirements.

In embodiments, the temperature control module identifies a complex driving situation based on one or more of upcoming road data, current weather data, and the number of objects being tracked.

In embodiments, the complex driving situation is identified based on a complexity metric exceeding a threshold, wherein the complexity metric calculated based on two or more of a road complexity rating, a camera visibility distance, a road surface rating, the number of objects being tracked, and past performance data. In this way, a particular situation may be identified as a complex driving situation based on the combination of a number of factors. For instance, an otherwise normal situation may be rendered complex if the current weather is rated as very poor or there are a large number of objects, such as other vehicles, pedestrians and cycles, which need to be simultaneously tracked by the ADS.

In embodiments, the temperature control module further identifies a processor capacity scenario, where the processor capacity scenario leads to the automation control module having capacity to increase the processing rate whilst maintaining a temperature below the operating temperature threshold, wherein the automation control module is configured to increase the speed of the vehicle in response to the temperature control module identifying a processor capacity scenario. In this way, the ADS may address a surplus of processing capability by increasing the vehicle's speed. For instance, in clear weather and limited traffic, the ADS may be able to handle higher speeds, without risking processor overload.

According to a fourth aspect, there is provided an electronic control unit for a vehicle incorporating the above automated driving system.

According to a fifth aspect, there is provided a method for use with an automated driving system, the method including the steps of: determining at a driver awareness module a level of driver awareness based on one or more driver awareness inputs; controlling at an automation control module one or more driving functions at a lower automation level; and activating a higher automation level in response to a determination that the level of driver awareness is below an awareness threshold.

According to a sixth aspect, there is provided a method for use with an automated driving system, the method including the steps of: controlling at an automation control module one or more driving functions of a vehicle; identifying at a temperature control module a processor overheating scenario, wherein the processor overheating scenario leads to the processor exceeding an operating temperature threshold, wherein the step of controlling one or more driving functions comprises reducing the speed of the vehicle in response to a processor overheating scenario being identified.

According to a seventh aspect, there is provided a non-transitory computer readable medium storing software including instructions which, when executed by a processor, perform the steps of: determining at a driver awareness module a level of driver awareness based on one or more driver awareness inputs; controlling at an automation control module one or more driving functions at a lower automation level; and activating a higher automation level in response to a determination that the level of driver awareness is below an awareness threshold.

According to an eighth aspect, there is provided a non-transitory computer readable medium storing software including instructions which, when executed by a processor, perform the steps of: controlling at an automation control module one or more driving functions of a vehicle; identifying at a temperature control module a processor overheating scenario, wherein the processor overheating scenario leads to the processor exceeding an operating temperature threshold, wherein the step of controlling one or more driving functions comprises reducing the speed of the vehicle in response to a processor overheating scenario being identified.

According to a ninth aspect, there is provided a method for use with an automated driving system, the method including the steps of: controlling at an automation control module one or more driving functions of a vehicle; and determining at a safety control module one or more operating conditions relevant to the safety performance of the vehicle, wherein the automation control module automatically adjusts the speed of the vehicle based on the one or more operating conditions determined by the safety control module.

According to a tenth aspect, there is provided a non-transitory computer readable medium storing software including instructions which, when executed by a processor, perform the steps of: controlling at an automation control module one or more driving functions of a vehicle; and determining at a safety control module one or more operating conditions relevant to the safety performance of the vehicle, wherein the automation control module automatically adjusts the speed of the vehicle based on the one or more operating conditions determined by the safety control module.

BRIEF DESCRIPTION OF THE DRAWINGS

Illustrative embodiments will now be described with reference to the accompanying drawings in which.

DETAILED DESCRIPTION

Figure 1:
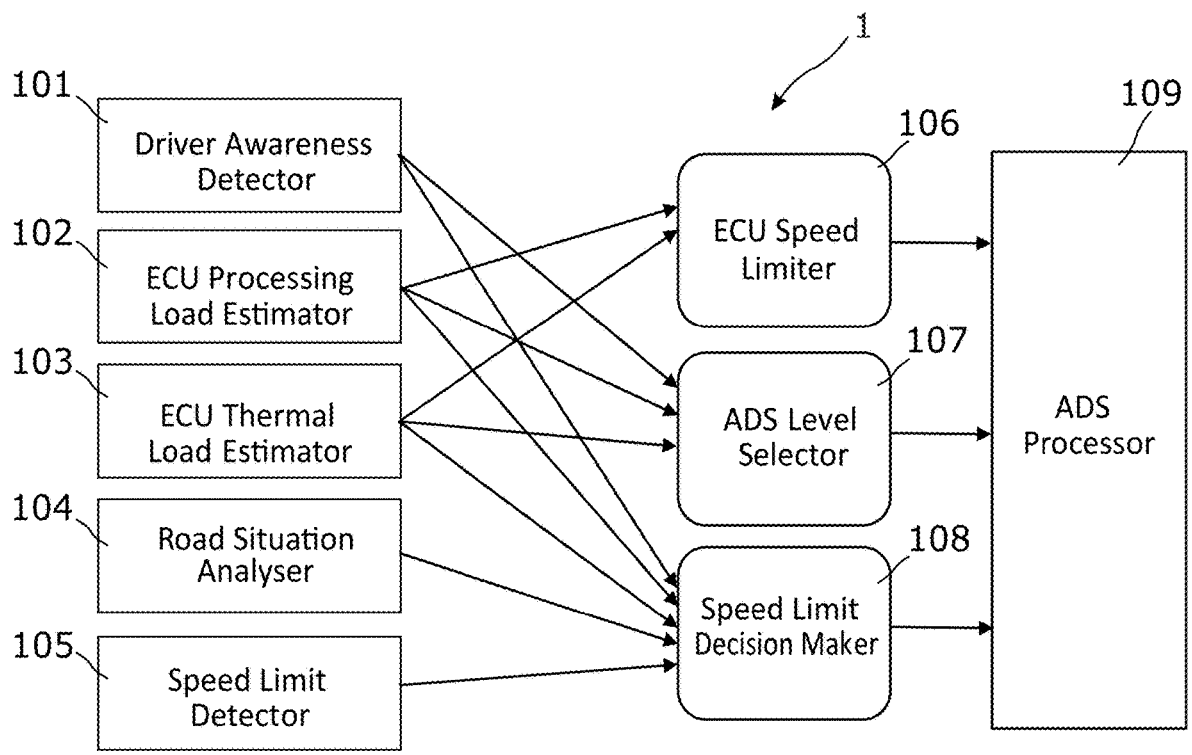
FIG. 1 shows a schematic illustration of an automatic driving system according to an embodiment.

FIG. 1 shows a schematic illustration of an automatous driving system (ADS) 1 according to an embodiment. In this embodiment, the ADS 1 is implemented as part of the vehicle's Electronic Control Unit (ECU) and is for use in a car having assisted and automatous driving capabilities. As such, the ADS 1 will comprise various perception systems used to monitor the driving environment and will automatically implement driving functions based on the determined conditions. The ADS 1 is operable to implement different levels of automation and, in particular, switch between a low automation level mode associated with SAE levels one or two (advanced driver assistance systems, ADAS), and a high level automation mode associated with SAE levels three and above. In this embodiment, the ADS 1 is capable implementing level two and level four automation. When level two automation is implemented, the driver is legally required to continue to monitor the driving environment, but the ADS 1 assumes control of both steering and vehicle speed functions. When SAE level four automation is implemented, the ADS is responsible for monitoring the driving environment and controls all driving functions, albeit with certain restricted parameters. In this embodiment, the vehicle speed is restricted when operating under higher, level four, automation mode.

The ADS 1 includes a number of input modules 101-105 which process data from a plurality of sensors to make determinations about the vehicle's operating condition and the environment within which it is driving. In this embodiment, the inputs include:

Driver awareness detector 101 which determines an awareness level of the driver based on, for example, sensor inputs from one or more of a driver eye tracking camera, a steering wheel contact sensor, a responsiveness monitor, and a lane tracking system;

ECU processing load estimator 102 which estimates the current load being processed by one or more of the processors within the ECU implementing the ADS. This estimate is used to identify when the processing load may exceed a threshold which could then lead to the processor overheating;

ECU thermal load estimator 103 which estimates the temperature of one or more of the processors within the ECU for identifying when the operating temperature has exceeded a threshold which could then lead to critical processor operations being compromised.

Road situation analyser 104 for determining the current driving environment external to the vehicle based on, for example, inputs from one or more of road map data, global positioning system (GPS) data, other vehicle and an object tracking sensors, road sign and traffic light cameras, and weather condition data; and Speed limit detector 105 for determining the current vehicle speed limit within the driving environment. This may be based on, for example, inputs from one or more of road map data, GPS data, and road sign cameras.

The input modules feed various processing paths of the ADS processor 109 for processing. That is, the input modules feed algorithm modules which subsequently control parameters which influence how the ADS algorithms control driving functions.

In this embodiment, the processing paths include:

ECU speed limiter 106 which determines actions in relation to limiting the processing load applied to the ADS processor 109;

ADS level selector 107 which determines the level of automation implemented by the ADS processor 109; and Speed limit decision maker 108 which determines the vehicle speed level applied by the ADS 1.

The ADS 1 provides safety functions in relation to the operating conditions of driver awareness and processor temperature which impact the safe driving performance of the vehicle. These aspects will be described in further detail below in relation to FIGS. 2 to 4.

The driver awareness function of the ADS 1 sets the level of autonomy of the vehicle based on the awareness state of the driver. As such, when the driver is aware, the ADS 1 may provide them with as much autonomy as they wish. For instance, the driver may operate the vehicle manually or engage the ADS 1 to provide level two automation. In this state, the continued driver awareness allows for minimal restrictions on driving parameters. For example, a driver may manually bring the vehicle up to a relatively high speed of say 140 km/h, depending on the current legal speed limit, and once the ADS is engaged, this speed will be maintained. However, if the ADS 1 subsequently detects that the driver has lost awareness, then the ADS automatically switches to the higher level of driving autonomy and takes steps to manage those autonomous driving conditions by, in this embodiment, significantly reducing the speed.

Figure 2:
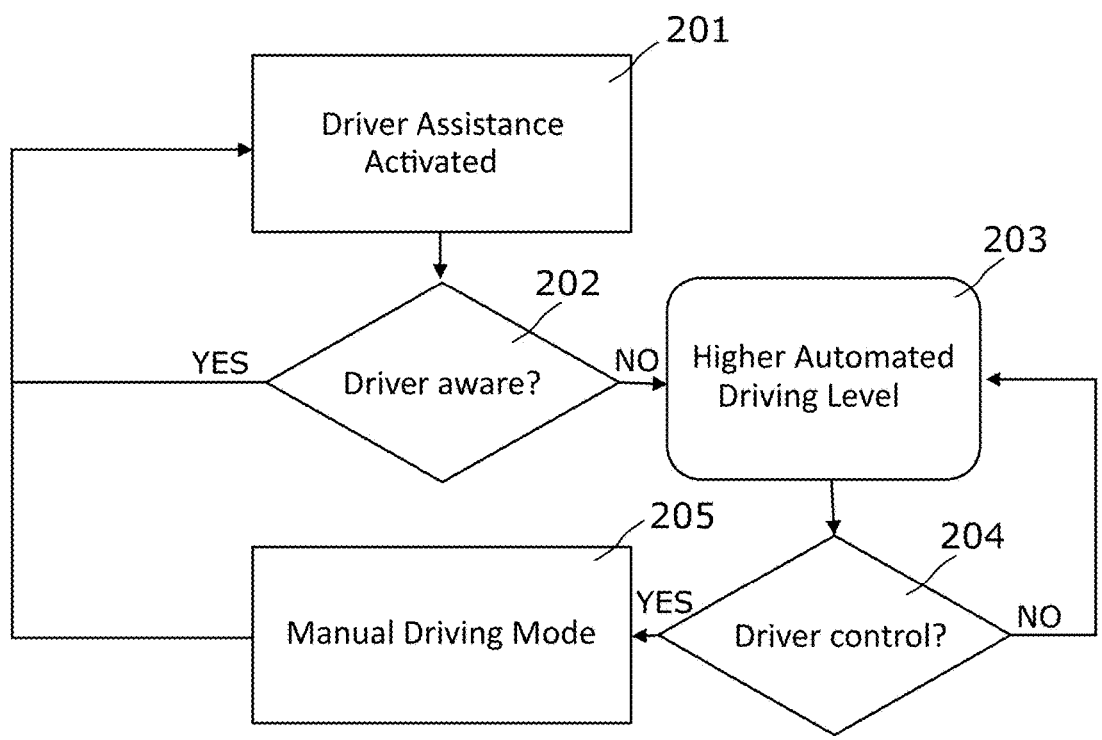
FIG. 2 shows a flow diagram of a driver awareness algorithm employed by the automatic driving system shown in FIG. 1.

To explain this further, FIG. 2 shows a flow diagram of the driver awareness algorithm employed by the ADS 1. In the example scenario, in step 201, the driver may activate driver assistance, and the ADS implements level 2 automation where the ADS 1 provides adaptive cruise control and lane keeping automation. As such, the vehicle may maintain its current speed of 140 km/h for highway conditions. The ADS 1 monitors driver awareness through the Driver Awareness Detector module 101 in step 202. If it is detected that the driver has fallen asleep or is otherwise distracted, the ADS Level Selector 107 switches the ADS Processor 109 to the higher automation level in step 203. However, the driving parameter of vehicle speed is limited at the higher automation level and hence the vehicle is automatically slowed down. For example, based on the Speed Limit Detector 105 determining a current speed limit of 140 km/h, the safe speed level at level four automation may be set at 80 km/h, for example. At the same time, the reduction in vehicle speed is performed in collaboration with the perception systems of the ADS 1 for ensuring the speed reduction is carried out in a safe manner depending on conditions, such as the level of traffic. As part of this, other complementary actions may also be enacted. For instance, the ADS 1 may indicate and change road lanes into the slow lane for allowing other traffic to pass. The speed reduction thereby provides a silent warning to the driver, whilst improving the safety of the vehicle, at the cost of a relatively small reduction in vehicle speed. If the diver regains awareness in step 204, they may then re-initiate manual driving in step 205 and choose to bring the vehicle back up to speed before reengaging the lower level, driver assistance, automation in step 201. In other alternative embodiments, the ADS 1 may instead reengage the lower level, driver assistance, in response to the driver regaining awareness, and then automatically bring the vehicle back up to speed.

Accordingly, with embodiments, when the driver's awareness drops below a set threshold, the level of autonomous driving is increased to compensate, albeit at the expense of driving speed. As such, the ADS 1 maintains safety until the driver has fully regained awareness. Non-essential comfort related functions may also be disabled when the higher automation level is activated in order to compensate for the additional ECU processing demands this imposes. Accordingly, the vehicle's available performance is effectively restricted based on the situational awareness of the driver.

The temperature protection function of the ADS 1 acts to avoid overheating by reducing the driving speed, which, in turn, reduces the data processing load required to manage the driving conditions and environment. For example, account may be taken for the external temperature conditions in which the ECU operates, as well as other weather conditions, and the complexity of the driving environment, including the number and type of objects the ADS 1 has to track at any given moment of time. In an illustrative scenario, the ADS 1 implementing the higher automation level may be traveling at a speed of 80 km/h. If it is a particularly hot summer day and the road is busy, there may be a risk of the ECU overheating because the cooling airflow over the ECU is already warm and the processor is tasked with tracking a large number of vehicles moving at relatively high speeds. To mitigate this risk, the temperature protection function responds by reducing the vehicle speed down to, for example, 60 km/h. As such, data analysis may be performed at lower rate (e.g. a reduced frame rate), thereby reducing the heat emitted by the ECU. The step of reducing the vehicle's speed is performed in collaboration with the perception systems of the ADS 1 to ensure the speed reduction is carried out in a safe manner depending on conditions. Other complementary actions, such as changing the road lane, may also be enacted as part of this process, as necessary.

Figure 3:
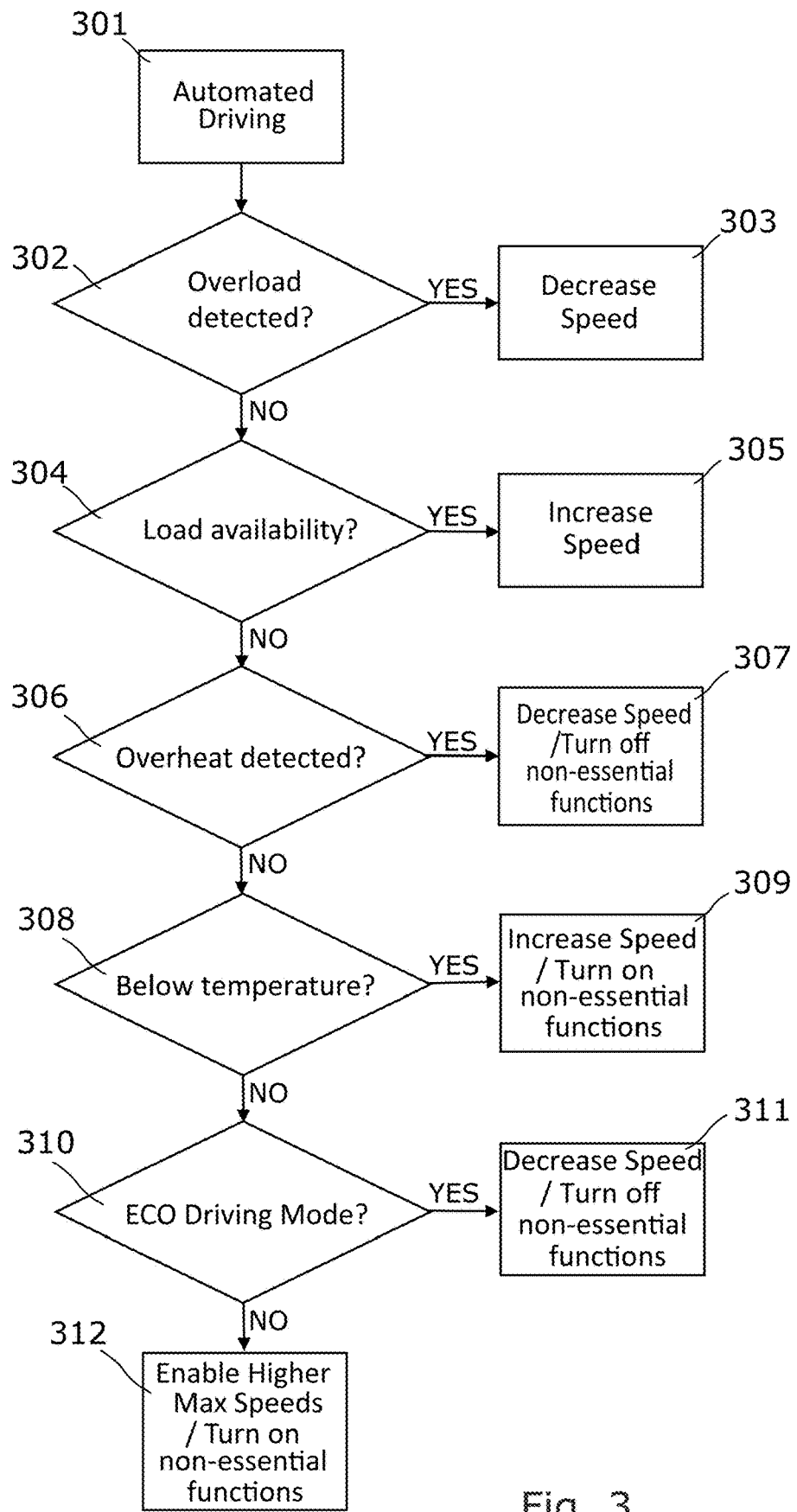
FIG. 3 shows a flow diagram of a first processor temperature protection algorithm employed by the automatic driving system shown in FIG. 1.
Figure 4:
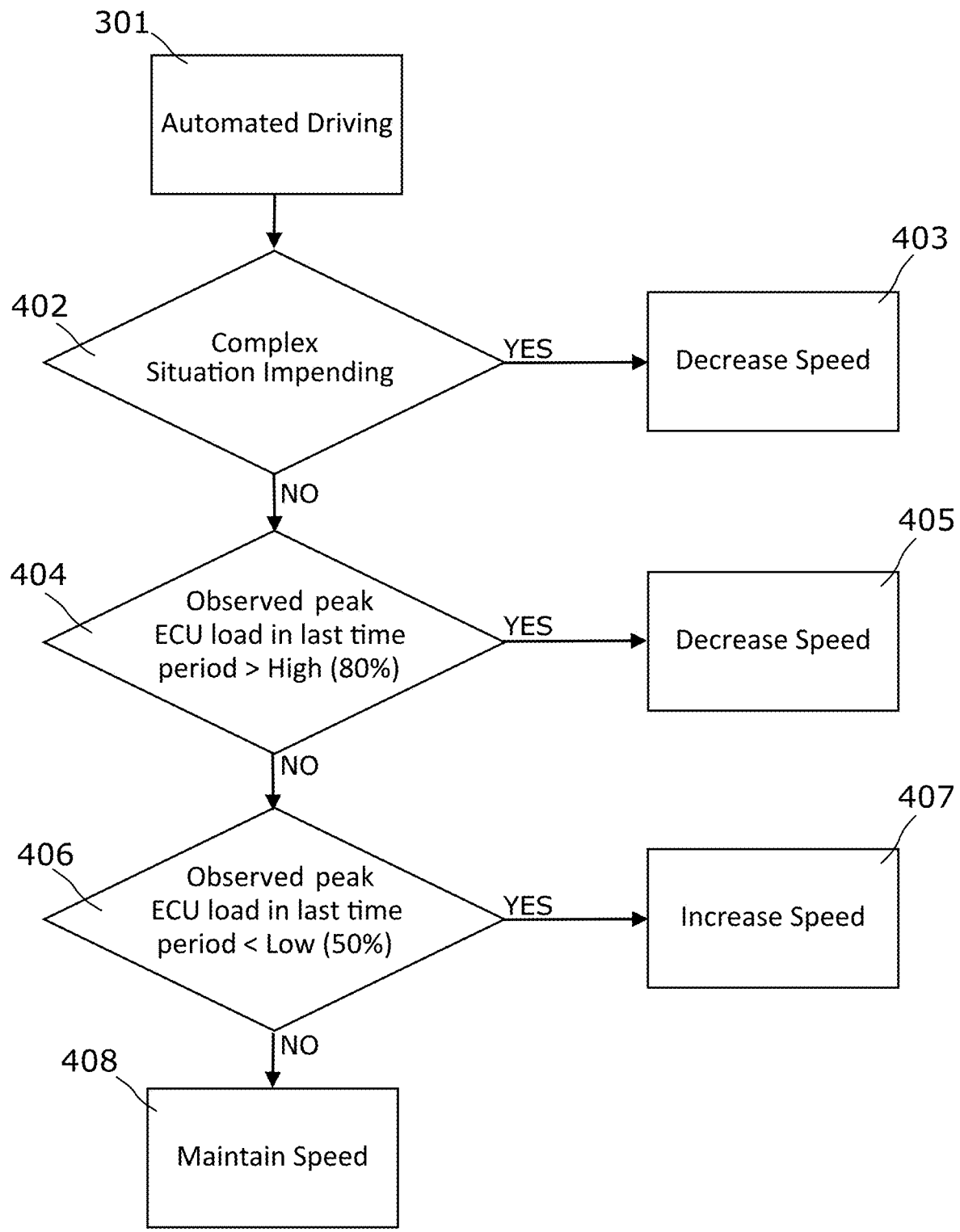
FIG. 4 shows a flow diagram of a second processor temperature protection algorithm employed by the automatic driving system shown in FIG. 1.

To explain this further, FIGS. 3 and 4 show flow diagrams of two processor temperature protection algorithms implemented by the ADS 1. In the first process shown in FIG. 3, the current ECU processing load is monitored using ECU Processing Load Estimator 102, along with the current ECU temperature using ECU Thermal Load Estimator 103. While automated driving 301 is activated, if the processing load exceeds a threshold (step 302) the driving speed is automatically reduced in step 303. Equally, if the ECU temperature exceeds a threshold (step 306), the driving speed is automatically reduced, and non-essential processing functions may also be deactivated to quickly minimise the processing burden (step 307). As such, an overheating scenario, which would otherwise lead to the ECU overheating, may be detected by the load or the temperature exceeding a threshold, and then mitigated by reducing the vehicle speed, which in turn minimises the processing demands imposed on the ECU. This may thereby provide a low-cost safety improvement with minimal impact on perceived performance of the overall system because such overheating scenario situations would happen relatively rarely.

The process shown in FIG. 3 further monitors for instances where the current ECU processing load is under-capacity (step 304). When an under-capacity scenario is detected, either because the processing load or the ECU temperature are much lower their operating thresholds (e.g. less than 50% of their capacity) (step 308), the driving speed may be automatically increased in steps 305 and 309. Non-essential processing functions may also be activated. In this way, particularly in instances where the driving speed was pre-emptively reduced to avoid overheating, the driving speed may be increased according to capacity in order to optimise performance.

The ADS 1 may also account for other driving functions. For instance, as shown in FIG. 3, step 310, if the driver or ECU has activated an economy (ECO) driving mode in order to conserve battery power in an electric vehicle, the ADS 1 may decrease the driving speed and turn off non-essential processing functions in step 311. The system thereby reduces the driving speed and/or the scope of functions performed by the ECU block in order to maximize the remaining range of the vehicle. Conversely, if ECO driving mode is off, a higher maximum speed is enabled, along with non-essential functions in step 312.

FIG. 4 shows a flow diagram of a second processor temperature protection algorithm implemented by the ADS 1. This algorithm provides pre-emptive action in the event that a complex road situation is impending. That is, if the detected road conditions and environment indicate an imminent increase of the ECU load which could otherwise lead to the ECU overheating (step 402), advance action is taken to reduce the vehicle speed (step 403), to thereby mitigate that risk by reducing the processing demands. For example, if the vehicle is approaching an area, such as a busy intersection or roundabout, in which a large number of other vehicles need to be tracked simultaneously and the road arrangement is relatively complex, the ADS 1 may identify this as a Complex Driving Situation. This may be determined based on, for example, map data together with camera analysis of the current road situation. It will be understood that the number of objects needing to be tracked, such as other vehicles, pedestrians and cycles, will typically correlate with denser areas. Therefore, the ADS 1 will typically slow the vehicle down in more urban areas. Equally, if the weather conditions indicate that driving visibility is poor and/or surface traction is reduced, normal intersections or junctions may also be identified as Complex Driving Situations. In cases where a Complex Driving Situation is identified, the vehicle's speed is reduced in response to mitigate the risk of ECU overheating.

As shown in step 404, the ECU Processing Load Estimator 102 continues to monitor ECU load. In instances where, despite no Complex Driving Situation having been identified, the ECU load exceeds a threshold (e.g. more than 80% of capacity used in the last 1 second period), the Speed Limit Decision Maker 108 may act to reduce the vehicle speed in step 405. Conversely, in situations where the ECU load is well below the capacity (e.g. less than 50% of capacity used in the last 1 second period) (step 406), the Speed Limit Decision Maker 108 may act to increase the vehicle speed in step 407. In situations where the ECU load is below the threshold but above the capacity (e.g. between 50% and 80% of capacity used in the last 1 second period) (steps 404 and 406), the Speed Limit Decision Maker 108 may maintain the vehicle speed in step 408. In embodiments, past performance data may be used to enhance the prediction of future Complex Driving Situations by adjusting the complexity threshold at which situations are identified as complex. For instance, an artificial intelligence (AI) neural network may be used to enhance this prediction by monitoring ECU load during different driving situations and learning from these historical instances.

Accordingly, with embodiments, in situations where ECU overheating is detected or predicted, the ADS 1 decreases the driving speed in a controlled manner in order to reduce the required data processing rate. For example, at lower vehicle speeds, the ECU may reduce the number of frames processed per second, or lower the processor's clock frequency. Non-essential functions, namely those that are not related to driving safety (e.g. active suspension), may also be temporarily disabled. For instance, if the CPU temperature reaches levels close to 100 degrees Celsius, where the upper limit is 110 degrees, the ADS 1 will reduce the vehicle's speed. As a result, the load of the processor decreases, so that the CPU clock can be reduced, or a number of processing cores can be switched off. At the same time selected functions not related to driving safety are turned off. As a result, the heat emission from the ECU is reduced, thereby allowing the ECU to cool. When the ECU temperature returns to a safe level, the ADS 1 returns the driving functions to full performance.

Accordingly, with embodiments, the ADS 1 may operate up to the maximum legal speed for given road segment under normal conditions, but the vehicle's speed is automatically reduced under unfavourable weather conditions, and/or if the driver loses awareness, and/or if ECU is at risk of overheating. Safety is thereby improved in situations where the driver loses awareness, and/or the ECU would otherwise be at risk of overheating. At the same time, the costs associated with cooling systems for the ECU may be minimised because the risk of ECU overheating is mitigated.

It will be understood that the embodiments illustrated above shows an application only for the purposes of illustration. In practice, embodiments may be applied to many different configurations, the detailed embodiments being straightforward for those skilled in the art to implement.

In this connection, for example, it will be understood that although the illustrative example has been described as being implemented as part of the ECU, it will be understood that it may be provided as one or more components in a system which interfaces with the ECU. Equally, embodiments may be provided as software for processing by a processor within the ECU or other multi-domain controller.

What is claimed is:

1. An automated driving system (ADS) comprising an ADS processor implemented on an electronic control unit (ECU), the ADS processor configured to:
   control one or more driving functions of a vehicle;
   obtain, from an ECU thermal load estimator of the ECU, an identification of an overheating scenario of the ADS processor that leads to the ADS processor exceeding an operating temperature threshold, the overheating scenario being based on a detected current processing load of the ADS processor used over a predetermined period of time exceeding a capacity threshold; and
   in response to obtaining the identification of the overheating scenario, reduce a speed of the vehicle.

2. The automated driving system of claim 1, wherein the ADS processor is further configured to reduce the speed of the vehicle by a predetermined level.

3. The automated driving system of claim 1, wherein the ECU thermal load estimator is configured to identify the overheating scenario based on the detected current processing load over the predetermined period of time exceeding the capacity threshold for a predetermined duration.

4. The automated driving system of claim 1, wherein the ADS processor is further configured to identify the overheating scenario based on receiving, from a road situation analyser of the ECU, an identification of a complex driving situation.

5. The automated driving system of claim 4, wherein the road situation analyser is configured to identify the complex driving situation based on one or more of upcoming road data, current weather data, or a number of objects being tracked.

6. The automated driving system of claim 5, wherein the road situation analyser is further configured to identify the complex driving situation based on a complexity metric exceeding a threshold.

7. The automated driving system of claim 6, wherein the complexity metric is based on two or more of a road complexity rating, a camera visibility distance, a road surface rating, the number of objects being tracked, or past performance data.

8. The automated driving system of claim 1, wherein the ECU thermal load estimator is further configured to identify a processing load capacity scenario that leads to the ADS processor having capacity to increase a processing load while maintaining a temperature below an operating temperature threshold.

9. The automated driving system of claim 8, wherein the ADS processor is further configured to increase the speed of the vehicle in response to obtaining an identification of the processing load capacity scenario from the ECU thermal load estimator.

10. The automated driving system of claim 1, wherein the ADS processor is further configured to reduce the speed of the vehicle by a dynamic level based on one or more operating conditions of the vehicle.

11. The automated driving system of claim 10, wherein the one or more operating conditions include driver awareness, the driver awareness being obtained from a driver awareness detector of the ECU that determines a level of driver awareness based on one or more driver awareness inputs.

12. The automated driving system of claim 11, wherein the ADS processor is further configured to activate a higher automation level in response to determining that the level of driver awareness is below an awareness threshold.

13. The automated driving system of claim 12, wherein the higher automation level comprises a further reduction of the speed of the vehicle.

14. A non-transitory computer-readable medium comprising computer-executable instructions that, when executed by an ADS processor implemented on an electronic control unit (ECU), cause the ADS processor to:
   control one or more driving functions of a vehicle;
   obtain, from an ECU thermal load estimator of the ECU, an identification of an overheating scenario of the ADS processor that leads to the ADS processor exceeding an operating temperature threshold, the overheating scenario being based on a detected current processing load of the ADS processor used over a predetermined period of time exceeding a capacity threshold; and
   in response to obtaining the identification of the overheating scenario, reduce a speed of the vehicle.

15. The non-transitory computer-readable medium of claim 14, wherein the overheating scenario is identified based on the detected current processing load over the predetermined period of time exceeding the capacity threshold for a predetermined duration.

16. The non-transitory computer-readable medium of claim 14, wherein the speed of the vehicle is reduced by a predetermined level.

17. The non-transitory computer-readable medium of claim 14, wherein the non-transitory computer-readable medium comprises further computer-executable instructions that, when executed by the ADS processor, cause the ADS processor to:
   identify the overheating scenario based on receiving, from a road situation analyser of the ECU, an identification of a complex driving situation, the complex driving situation being based on one or more of upcoming road data, current weather data, or a number of objects being tracked.

18. The non-transitory computer-readable medium of claim 14, wherein the non-transitory computer-readable medium comprises further computer-executable instructions that, when executed by the ADS processor, cause the ADS processor to:
   obtain, from the ECU thermal load estimator, an identification of a processing load capacity scenario that leads to the ADS processor having capacity to increase a processing load while maintaining a temperature below an operating temperature threshold; and
   increase the speed of the vehicle in response to obtaining the identification of the processing load capacity scenario from the ECU thermal load estimator.

19. The non-transitory computer-readable medium of claim 14, wherein the speed of the vehicle is reduced by a dynamic level based on one or more operating conditions of the vehicle.

20. A method for use in an automated driving system (ADS) performed by an ADS processor implemented on an electronic control unit (ECU), the method comprising:
   controlling one or more driving functions of a vehicle;
   obtaining, from an ECU thermal load estimator of the ECU, an identification of an overheating scenario of the ADS processor that leads to the ADS processor exceeding an operating temperature threshold, the overheating scenario being based on a detected current processing load of the ADS processor used over a predetermined period of time exceeding a capacity threshold; and
   in response to obtaining the identification of the overheating scenario, reducing a speed of the vehicle.

* * * * *